United States Patent
Aksnes et al.

(12) 
(10) Patent No.: US 6,757,295 B1
(45) Date of Patent: Jun. 29, 2004

(54) METHOD FOR REGENERATING A POINT-TO-MULTIPOINT INTERFACE ON A POINT-TO-POINT INTERFACE

(75) Inventors: Anne Kristin Aksnes, Asker (NO); Pål Longva Hellum, Sandvika (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/369,306

(22) Filed: Aug. 2, 1999

Related U.S. Application Data

(63) Continuation of application No. PCT/NO98/00014, filed on Jan. 15, 1998.

(30) Foreign Application Priority Data

Feb. 3, 1997 (NO) .............................................. 0467/97

(51) Int. Cl.[7] .................................................. H04J 3/16
(52) U.S. Cl. ..................... 370/465; 370/270; 370/389; 370/375; 370/395.6
(58) Field of Search ................................. 370/260, 261, 370/262, 270, 364, 365, 380, 389, 395.1, 395.54, 395.6, 395.7, 395.71, 395.72, 465, 469, 475, 390

(56) References Cited

U.S. PATENT DOCUMENTS

| | | | |
|---|---|---|---|
| 5,202,885 A | | 4/1993 | Schrodi et al. ............ 370/94.1 |
| 5,287,530 A | | 2/1994 | Davis et al. ................ 370/94.1 |
| 5,418,786 A | | 5/1995 | Loyer et al. ................ 370/94.2 |
| 5,485,456 A | * | 1/1996 | Shtayer et al. .............. 370/395 |
| 5,541,915 A | | 7/1996 | Storm ........................ 370/60.1 |
| 5,617,233 A | * | 4/1997 | Boncek ...................... 370/389 |
| 5,802,052 A | * | 9/1998 | Venkataraman ............. 370/395 |
| 5,841,976 A | * | 11/1998 | Tai et al. ..................... 370/260 |
| 5,999,528 A | * | 12/1999 | Chow et al. ................. 370/365 |

FOREIGN PATENT DOCUMENTS

| | | | | |
|---|---|---|---|---|
| CA | 2181293 | | 1/1997 | ........... H04L/12/56 |
| GB | 2 303 521 A | | 2/1997 | ........... H04Q/11/04 |

OTHER PUBLICATIONS

The ATM Forum Technical Committee, "UTOPIA Level 2, Version 1.0", af–phy–0039.000, Jun. 1995.

* cited by examiner

*Primary Examiner*—Dang Ton
*Assistant Examiner*—Shick Hom
(74) *Attorney, Agent, or Firm*—Nixon & Vanderhye P.C.

(57) ABSTRACT

A method of regenerating a point-to-multipoint interface on a point-to-point interface in an ATM (Asynchronous Transfer Mode) network configuration is provided. It is determined from which circuit an ATM cell originated by using pre-pending byte(s) and/or user defined byte(s); individual tag(s) are assigned; and at least one tag is decoded corresponding to the point-to-multipoint address.

9 Claims, 6 Drawing Sheets

Block diagram which shows the logic flow of this invention

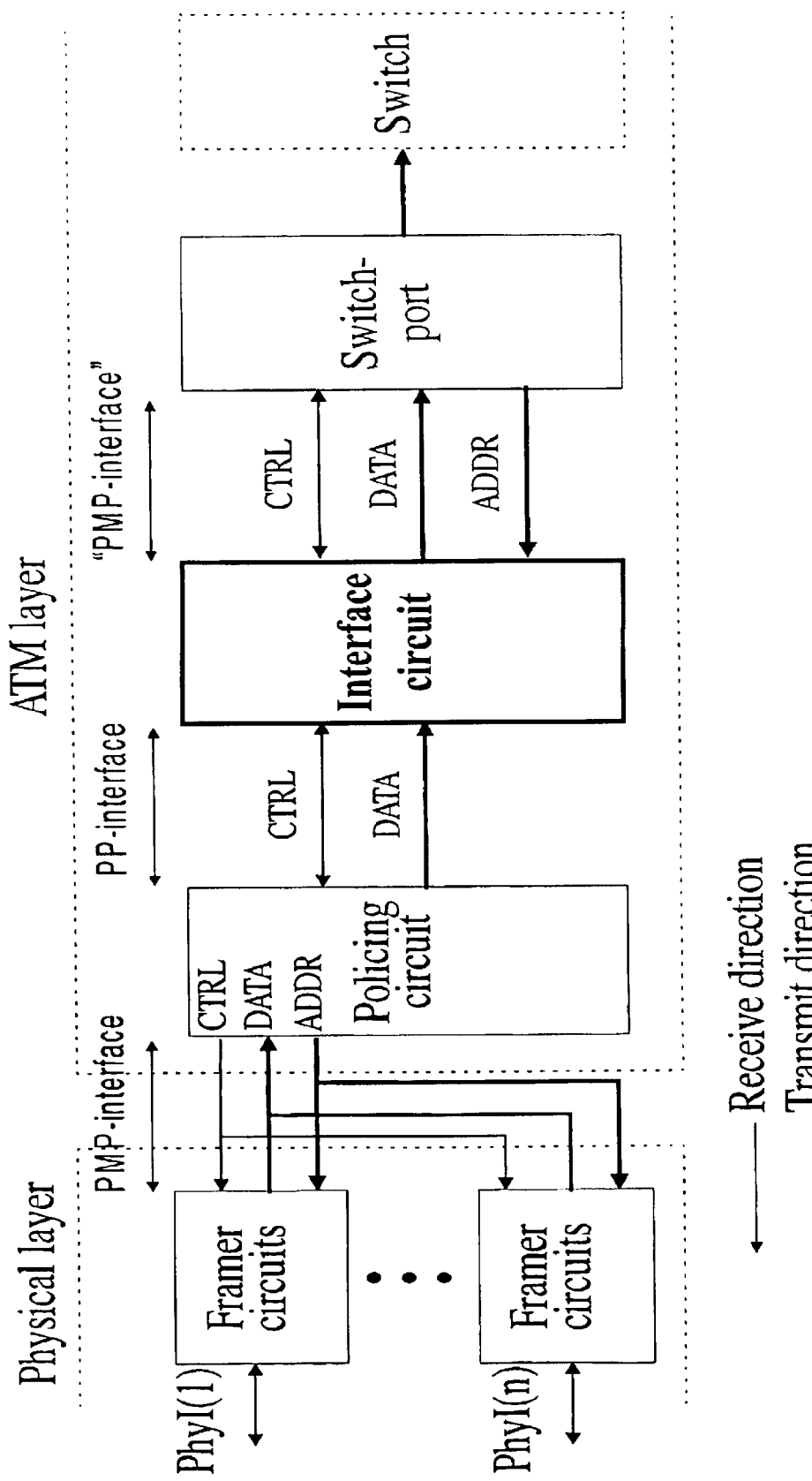
Figure 1   Example of where to use the invention

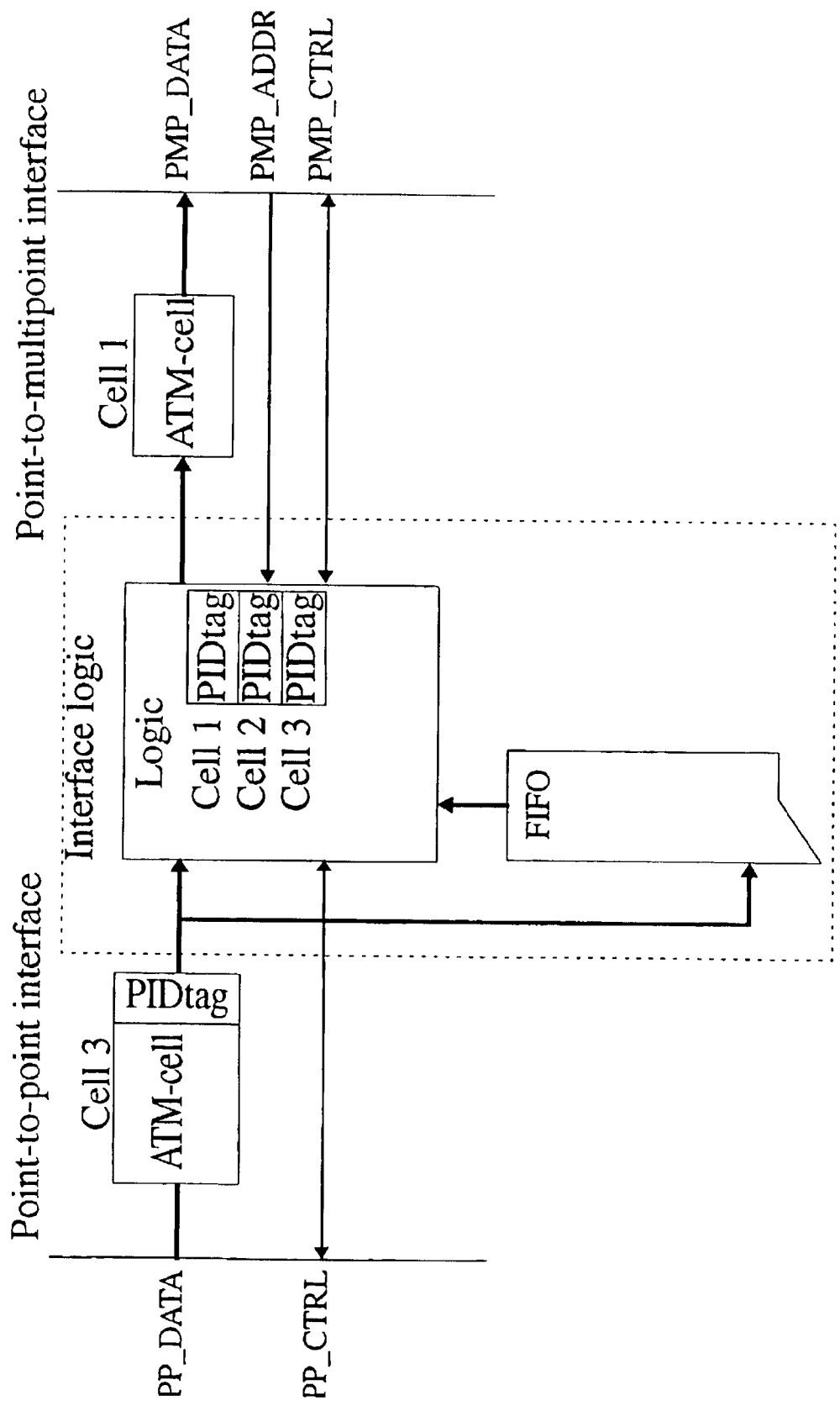
*Figure 2   Block diagram which shows the logic flow of this invention*

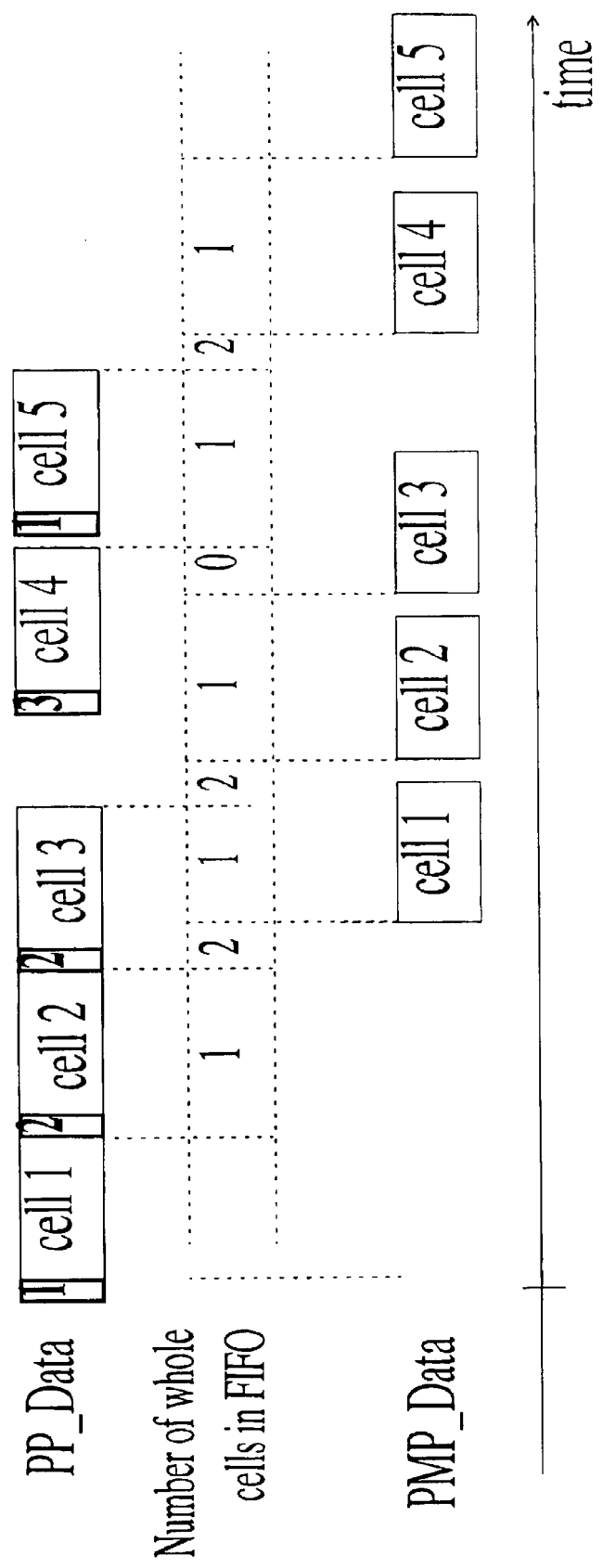
*Figure 3    Example of data-flow and FIFO-filling*

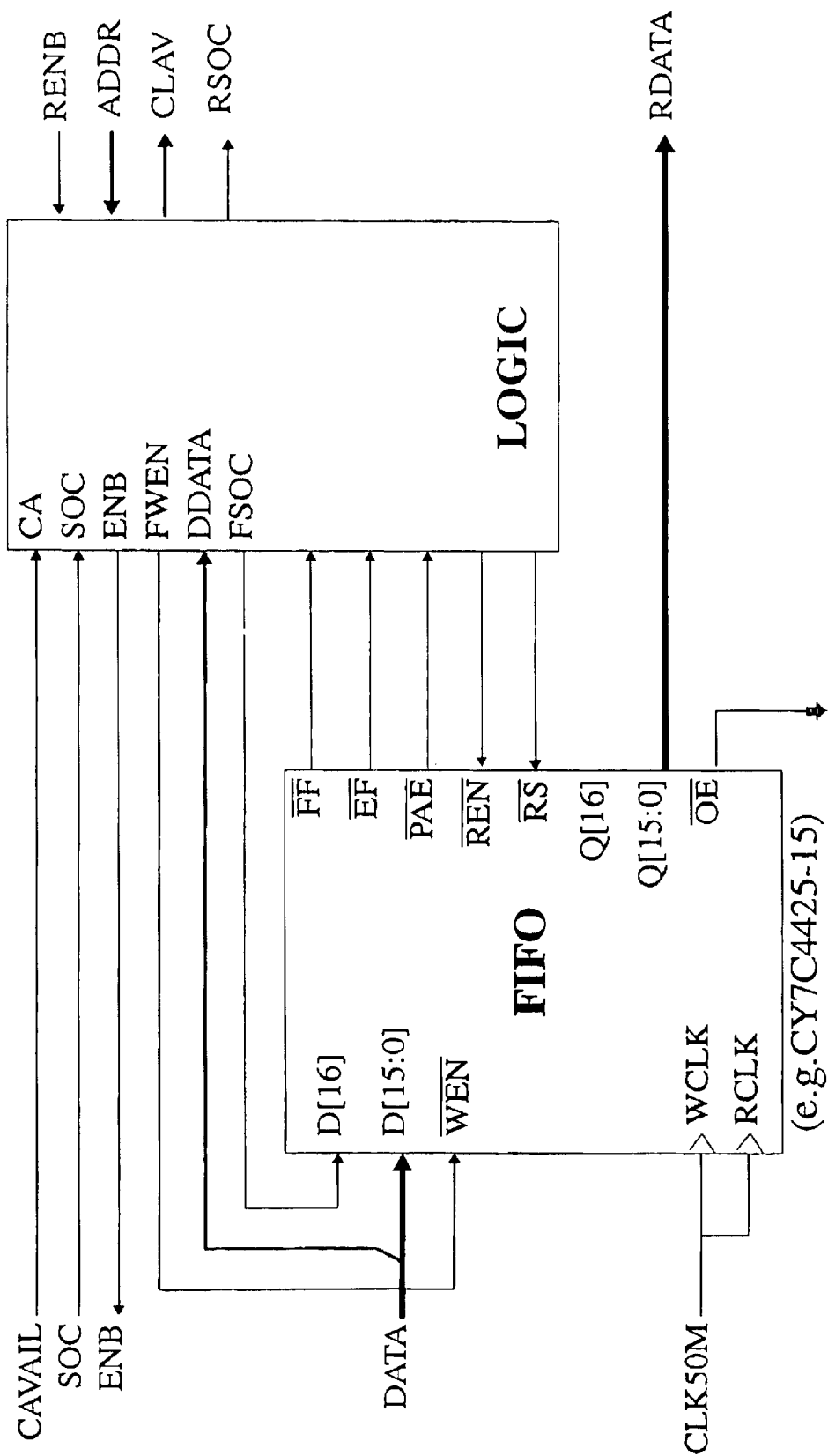
Figure 4   Example of implementation

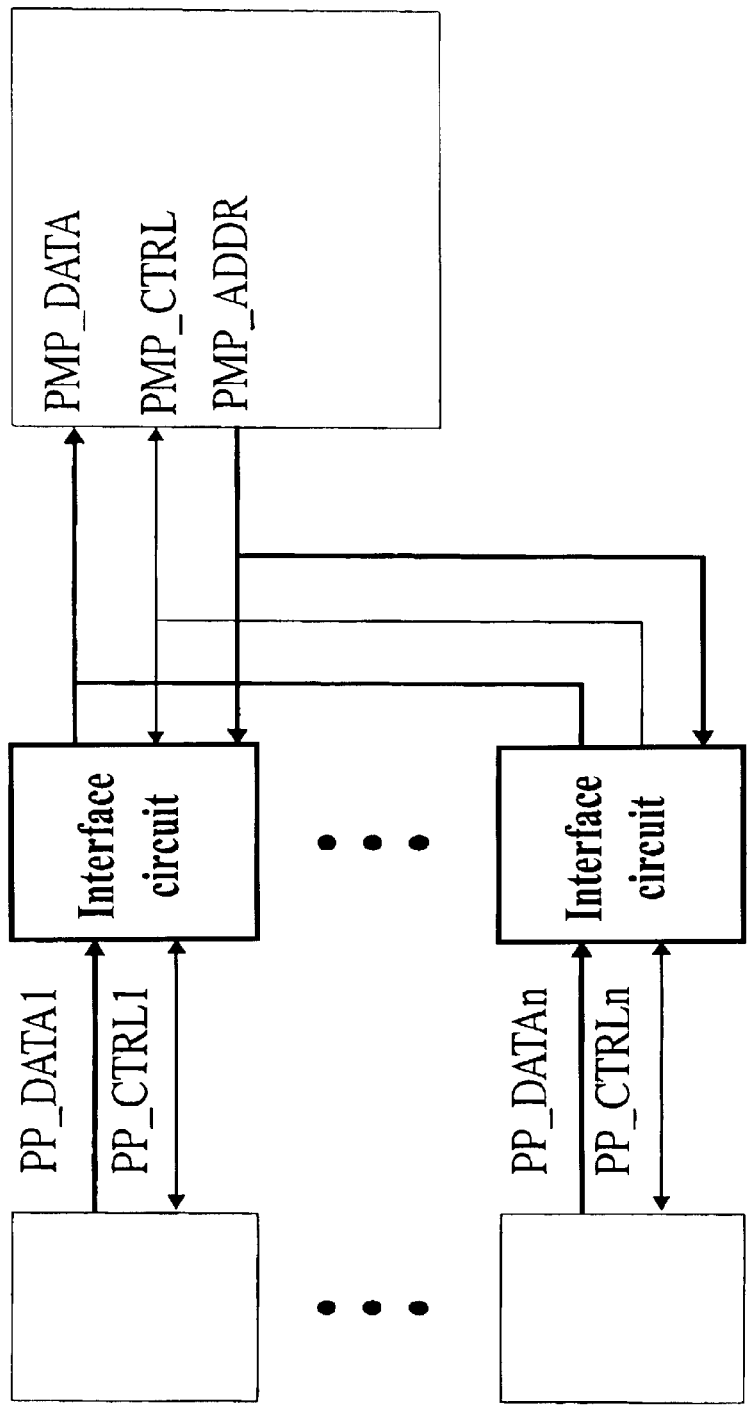
Figure 5  Example of using the interface circuit to connect several point-to-point interfaces to one point-to-multipoint interface.

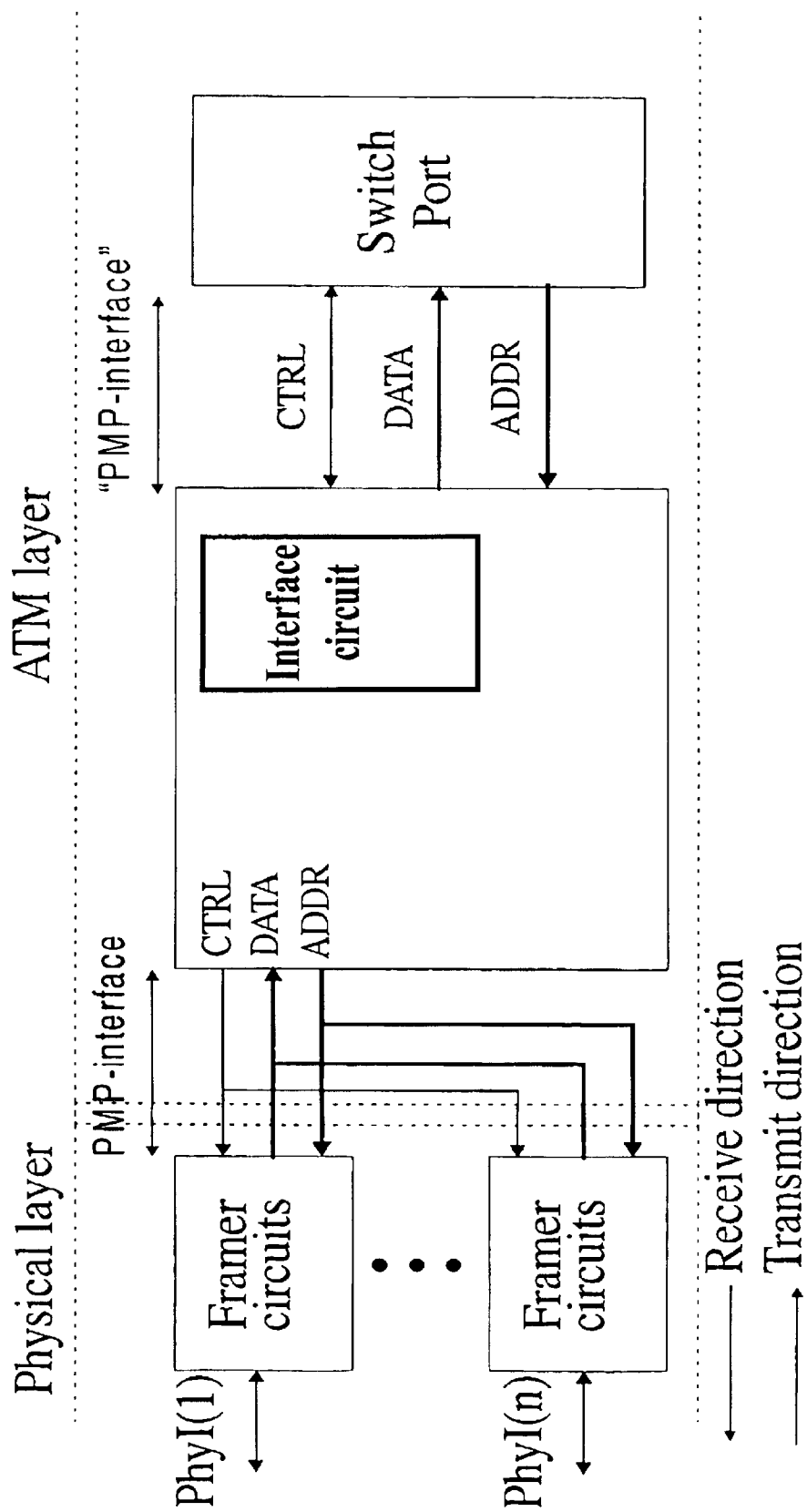
Figure 6  Example of where to use the invention

METHOD FOR REGENERATING A POINT-TO-MULTIPOINT INTERFACE ON A POINT-TO-POINT INTERFACE

This is a continuation of PCT application No. PCT/NO98/0014, filed Jan. 15, 1998, the entire content of which is hereby incorporated by reference in this application.

FIELD OF THE INVENTION

The present invention relates to a method for regenerating a point-to-multipoint interface on a point-to-point interface, especially in an ATM (Asyncronous Transfer Mode) design.

More specifically the present invention gives instructions for how to emulate a point-to-multipoint interface on a point-to-point interface and to regenerate the physical layer information that was lost when information was transferred from a point-to-multipoint interface to a point-to-point interface.

TECHNICAL FIELD

Problem Area

Today there exist several ATM-components on the market. Some have only point-to-point interfaces, while others have point-to-multipoint interfaces. Typically point-to-point interface are UTOPIA level 1 or SCI-PHY+ for single-PHY interfaces. The point-to-multipoint interfaces are typically UTOPIA level 2 or SCI-PHY+ for multiple-PHY (Ref. [1]) and Ref. ([2]).

This invention can typically be used when one have several physical interfaces (PhyI(1) to PhyI(n)) connected to ATM layer circuit, for example one policing-circuit, which has only one point-to-point interface towards a switch-port. If the switching-circuit has a point-to-multipoint interface capability, this solution can be inserted between the policing circuit and the switch port, so as to emulate a multi-point interface towards the switch port.

The benefit of this is to increase the number of connections per interface and to allow free use of VPIs per physical interface.

This invention covers the shaded part of FIG. 1.

Two cells with identical VPI and VCI can come into this system from different physical interfaces. When these two interfaces are merged into a point-to-point interface, these two cells must be separated in some way, and the difference must be visible to the switch-port. Some circuits have the possibility to insert a tag-field which may contain information about which physical interface the ATM-cell comes from. Circuits which are compliant to standarized point-to-multipoint interfaces (e.g. UTOPIA level 2) are, however, not able to use this information.

Known Solutions and Problems Related to Prior Art

To distinguish between two cells with identical VPI and VCI on different physical interfaces, an address-translation in the ATM-cell header can be done in the circuit ahead of the switch-port. The switch-port will see two different ATM-cells on one physical address. The maximum number of VPCs in the switch-port will be limited to 4k (NNI), and the maximum number of VCCs will be 64k. If there had been a point-to-multipoint interface all the way into the switch-port, this limitation would have been per physical interface, but when using an address-translation this limitation is on all the physical interfaces together. The maximum number of VPCs on each physical interface will typically be 4096 (VPI is 12 bits wide) divided by the-number of physical interfaces.

This approach requires that the switch-port can be set in a point-to-point interface mode. Often, that can result in that the point-to-point interface on the transit-side also is disabled, which introduces limitations out from the switch-port as well.

From U.S. Pat. No. 5,541,915 (Storm) there is known a method for point-to-multipoint connections in self-routing ATM-switching networks, without limiting the dynamics thereof. This specification suggests further marking in the header data of the ATM-cells beyond VCI/VPI for multi-point transmission of ATM-cells without substantially increasing the volume of data.

A similar system is disclosed in U.S. Pat. No. 5,287,530 (Davis et al.) which discloses a multicast server operators operative to effect the onward transmission of data cells to a plurality of different addresses. When a data cell is received at one of a plurality of input ports, comprising an address which is indicated by the VCI and VPI as being a cell which should be routed to a plurality of different addresses, routing tags are set within a switch function unit such that the cell is routed to a transfer port. From U.S. Pat. No. 5,459,724 (Jeffrey et al.) there is known an ATM-switching arrangement comprising an input adaption port X with intermediate storage of cells and separated central control.

From U.S. Pat. No. 5,202,885 (Schrodi et al.) there is known an ATM system comprising switches for copying ATM data cells, so as to enable handling of various types of point-to-multipoint traffic, for example broadcast or multicast. This prior art ATM system comprises point-to-point connections having either high or low fanout. The copying of cells makes it possible for the point-to-point connections and for the system thereby to handle all types of data traffic.

However, U.S. Pat. No. 5,202,885 is silent about the problems which arise when ATM traffic on a card is transferred from a point-to-point interface, and is also silent about regenerating a point-to-multipoint interface on a point-to-point interface.

In other words, U.S. Pat. No. 5,202,885 relates to ATM connections referring to higher protocol layers and the connectivity between different types of end points, whereas the present invention relates to interfacing, i.e. the physical connection between circuits. Consequently, U.S. Pat. No. 5,202,885 is also silent about the generation of information which is lost at tahe transition between point-to-multipoint and point-to-point interfaces.

U.S. Pat. No. 5,418,786 (Loyer et al) and U.S. Pat. No. 5,485,456 (Shtayer et al) relate to additions and variations of interfaces of UTOPIA standards applicable between the physical layer and the ATM layer.

CA 2,181,293 (PCM-Sierra, INC.) relates to a policing circuit including interface towards physical layer, with the possibility of adding tag fields towards the switch gate.

SUMMARY OF THE INVENTION

The present invention relates to a method as stated in the preamble, which in a more efficient manner is able to regenerate a point-to-multipoint interface on a point-to-point interface, as compared with prior art.

Consequently, a method as stated in the preamble is according to the present invention characterized in that the method comprises the following steps:

a) using a circuit means with a point-to-point interface for the connection thereof to a plurality of interfaces, b) using said circuit means to identify from which physical interface any cell originated, namely c) by using pre-pending byte(s) or the user defined byte(s) in the respective ATM-cell, for thereby regenerating the physical layer information which was lost at transition between said interfaces.

Appropriately, the present method suggest that said pre-pending byte(s) or user defined byte(s) in said ATM-cells are assigned individual tags, for example a PID tag (Physical Interface Identification tag).

A further advantage of this method is that the use of said circuit means to identify from which physical interface any cell originated, is effected without introducing limitations on the number of VPCs (Virtual Path Connections) and/or VCCs (Virtual Channel Connections).

Further advantages and features of the present method will appear from the following description taken in connection with the enclosed drawings, as well as from the appending patent claims.

BRIEF DISCLOSURE OF THE DRAWINGS

FIG. 1 is a block diagram illustrating an ATM design wherein the present invention can be used.

FIG. 2 is a block diagram illustrating an embodiment of the logic flow according to the present invention.

FIG. 3 is a diagram illustrating data-flow and FIFO-filling.

FIG. 4 is a block diagram illustrating another embodiment of how the present invention can be implemented.

FIG. 5 is a block diagram illustrating the use of an interface circuit to connect several point-to-point interfaces to one point-to-multipoint interface.

FIG. 6 is a block diagram illustrating another application of the present invention.

DESCRIPTION OF EMBODIMENTS

This invention shall be used to connect a circuit with only point-to-point interface to a point-to-multipoint interface. The circuit with the point-to-point interface can be connected to several physical interfaces, see FIG. 1. The circuit must be able to identify from which physical interface the cell originated, without introducing limitations on the number of VPCs and/or VCCs. This can be done using pre-pending byte(s) or the user defined byte(s) in the ATM-cell. This field will be referred to as PIDtag (Physical interface IDentification tag).

The point-to-multipoint interface can address up to 32(31) interfaces using the address-lines. To be able to receive adjacent cells without reducing the bandwidth on the point-to-multipoint interface, the switch-port, see FIG. 1, must poll where to receive the next cell from, when it receives previous cell. To be able to do this, the PIDtag of the next cell must be available and decoded to respond to the point-to-multipoint address and control-signals in time for this polling. Some intermediate storage must therefore be available in the interface block.

FIG. 3 shows the function of the invention. The size of the FIFO can be 2 cells and deeper. In this example the FIFO is 3 cells deep. The FIFO will introduce a CTD and/or CDV in the system. The handling of the FIFO determines the CTD and CDV that is achieved. It should be fairly easy to implement the FIFO in a way that only introduces a fixed CTD and no or very little CDV in the system.

FIG. 2 is a block diagram illustrating the logic flow according to the present invention.

The interface circuit reads data from the point-to-point interface when there is room in the FIFO for a new cell. The Physical interface IDentification tag (PIDtag) is decoded to correspond to the point-to-multipoint addressing (PMP_ADDR) and stored inside the logic while the ATM-cell is stored in the FIFO. The logic must know which PIDtag that corresponds to which cell in the FIFO. (E.g. by letting the sequence of the PIDtag correspond to the ATM-cell sequence in the FIFO).

When the point-to-multipoint interface polls the physical address which corresponds to the PIDtag of the next cell in the FIFO, the interface circuit acknowledges that it has a cell to send. When the point-to-multipoint inter-face reads a cell, it will always get the first cell in the FIFO.

The cell-flow and the number of whole cells in the FIFO is shown in FIG. 3. Here the PIDtag is marked as the grey part of the cell. The PIDtag could also be the user-defined byte(s) in the ATM-cell. Then the cells on both sides of the interface ciruit would have the same length.

FIG. 4 shows an example of how this function can be implemented.

Advantages

This interface circuit will regenerate the information lost when transforming a point-to-multipoint interface into a point-to-point interface. The physical interface address will follow the cell all the way to the switch-port. The number of VPCs and/or VCCs into each physical interface will not depend on the number of VPCs and/or VCCs on other physical interfaces. The switch-port will be able to use full UTOPIA level 2 without any limitations.

This interface circuit will remove the need of internal address-translation in the policing-circuit. Two cells with identical VPI and VCI can come into this system from different physical interfaces. When these two interfaces are merged into a point-to-point interface these two cells must be separated in some way. This difference must be visible for the switch-port. Since the switch-port usually do not have the opportunity to decode a physical interface identification byte, the obvious way would be to translate the VPI and/or the VCI into an internal address.

This circuit can be implemented in a way that only introduces extra CTD and no extra CDV in the system. For CBR- and real-time VBR-traffic it is important to minimize the introduced CDV in the system.

Broadening

This interface circuit can also be used to connect several point-to-point interfaces to one point-to-multipoint interface, see FIG. 5.

This interface circuit can be used wherever there is a need to regenerate the information of a multi-physical interface which has been transformed to a single-physical interface. The invention is not limited to be used only between a policing-circuit and a switch-port.

This function can also be a part of another circuit, e.g. the policing circuit. The address-lines are translated to a PIDtag internally in the circuit. The next circuit will then see UTOPIA level 2 and the physical interface information will not be lost.

References

[1] SCI_PHY™ Saturn Compatible Interface for ATM PHY Devices (Level 2) Issue 3: November, 1995 from PMC-Sierra Inc.

[2] UTOPIA Specification Level 2, V0.8 1994 from The ATM Forum

| Abbreviations | |
|---|---|
| ADDR | Here: Address signals |
| ATM | Asynchronous Transfer Mode |
| CTRL | Here: Control signals |
| CBR | Constant Bit Rate |
| CDV | Cell Delay Variation |
| CTD | Cell Transfer Delay |
| FIFO | First In First Out |
| NNI | Network Node Interface |
| PHY | Physical |
| PhyI(n) | Here: Physical interface number n |
| PIDtag | Here: Physical interface IDentification tag |
| PMP | Here: Point-to-multipoint |
| PP | Here: Point-to-point |
| SCI-PHY+ | Saturn Compatible Interface for PHYsical layer and ATM layer |
| UTOPIA | Universal Test & Operations PHY Interface for ATM |
| VBR | Variable Bit Rate |
| VCC | Virtual Channel Connection |
| VCI | Virtual Channel Identification |
| VPC | Virtual Path Connection |
| VPI | Virtual Path Identification |

What is claimed is:

1. A method of regenerating a point-to-multipoint interface on a point-to-point interface in an ATM (Asynchronous Transfer Mode) network configuration, the method comprising:
   a) using a circuit means with the point-to-multipoint interface and the point-to-point interface, for transmission of data to/from a plurality of circuits on said point-to-point interface,
   b) using said circuit means to identify from which circuit an ATM cell originated, by using pre-pending byte(s) and/or user defined byte(s) in the respective ATM cell,
   c) assigning individual PID tags (Physical Interface Identification tags) to said byte(s),
   d) providing intermediate storage means in said point-to-point interface;
   e) causing said circuit means to read data from said point-to-point interface, at least one of the physical interface identification tags (PID tags) being decoded corresponding to a point-to-multipoint address (PMP_ADDR), said PID tag being stored in logic means, while storing said ATM cell,
   f) using said logic means to identify which PID tag corresponds to which ATM cell being stored, and
   g) causing said circuit means to respond to polling from the point-to-multipoint interface of a port following said circuit means by responding to the point-to-multipoint address which corresponds to the PID tag of the next ATM cell in storage.

2. Method as claimed in claim 1, wherein said intermediate storage means includes at least one FIFO memory having a size of two ATM cells or more.

3. Method as claimed in claim 2, wherein said logic means identifies which PID tag corresponds to which ATM cell in said FIFO by letting a sequence of PID tags correspond to an actual ATM-cell sequence in said FIFO, wherein the point-to-multipoint address follows the ATM cell in question all the way to the associated port.

4. Method as claimed in claim 3, wherein said circuit means is used in connection with the point-to-multipoint interface which can address a plurality of interfaces, by using address-lines thereof.

5. Method as claimed in claim 4, wherein said intermediate storage means comprises a plurality of FIFO memories and handles said FIFOs so as to optimize CTD (Cell Transfer Delay) and CDV (Cell Delay Variation).

6. Method as claimed in claim 5, implementing said intermediate storage such as to only introduce a fixed CTD (Cell Transfer Delay) and no CDV (Cell Delay Variation).

7. Method as claimed in claim 6, wherein a number of VPCs (virtual Path Connections) and/or VCCs (Virtual Channel Connections) associated with each circuit is/are made to be independent of the number of VPCs and/or VCCs on any other circuit.

8. Method as claimed in claim 1, wherein the interface circuit is adapted to remove a need of internal address-translations in a corresponding policing circuit, by causing two ATM cells with identical VPI (Virtual Path Identification) and VCI (Virtual Channel Identification) be admitted from different circuits, and letting the point-to-multipoint address of said cells follow said cells all the way to any switch port.

9. Method as claimed in claim 1, wherein said circuit means is used as part of an appropriate circuit in a data transmission system of an ATM transmission system and as part of a policing circuit, and said circuit means translates an associated address-line(s) to appropriate PID tag(s) internally in said circuit means conserving circuit information, and for letting a next circuit see a point-to-multipoint interface.

* * * * *